(12) United States Patent
Blauvelt et al.

(10) Patent No.: US 7,596,526 B2
(45) Date of Patent: Sep. 29, 2009

(54) SYSTEM AND METHOD FOR MANAGING A SERIES OF OVERNIGHT FINANCING TRADES

(75) Inventors: Joseph P. Blauvelt, Nutley, NJ (US); Frank J. Curialle, Asbury, NJ (US)

(73) Assignee: JPMorgan Chase Bank, N.A., New York, NY (US)

( * ) Notice: Subject to any disclaimer, the term of this patent is extended or adjusted under 35 U.S.C. 154(b) by 1184 days.

(21) Appl. No.: 10/123,946

(22) Filed: Apr. 16, 2002

(65) Prior Publication Data

US 2002/0188553 A1  Dec. 12, 2002

Related U.S. Application Data

(60) Provisional application No. 60/284,158, filed on Apr. 16, 2001.

(51) Int. Cl.
*G06Q 99/00* (2006.01)
(52) U.S. Cl. ......................................................... 705/37
(58) Field of Classification Search .............. 705/35–37
See application file for complete search history.

(56) References Cited

U.S. PATENT DOCUMENTS

| | | |
|---|---|---|
| 4,169,285 A | 9/1979 | Walker |
| 4,648,038 A | 3/1987 | Roberts et al. |
| 4,739,478 A | 4/1988 | Roberts et al. |
| 4,742,457 A | 5/1988 | Leon et al. |
| 4,752,877 A | 6/1988 | Roberts et al. |
| 4,933,842 A | 6/1990 | Durbinet et al. |
| 5,121,469 A | 6/1992 | Richards et al. |
| 5,222,019 A | 6/1993 | Yoshino et al. |
| 5,257,369 A | 10/1993 | Skeen et al. |
| 5,270,922 A | 12/1993 | Higgins |
| 5,297,032 A | 3/1994 | Trojan et al. |

(Continued)

FOREIGN PATENT DOCUMENTS

WO    WO 98/43170    10/1998

(Continued)

OTHER PUBLICATIONS

Edward Kane☐☐The Journal of Finance, vol. 35, No. 2, Papers and Proceedings Thirty-Eighth Annual Meeting American Finance Association, Atlanta, GA, Dec. 28-30, 1979. (May 1980), pp. 221-2234.*

(Continued)

*Primary Examiner*—Thu Thao Havan
*Assistant Examiner*—Thomas M Hammond, III
(74) *Attorney, Agent, or Firm*—Hunton & Williams LLP

(57) ABSTRACT

A system and method that decomposes what would otherwise constitute a term securities financing trade contract into one current trade and a plurality of forward trades. The decomposed trades (current and forward) are transmitted back to the contracting parties and executed simultaneously In order to assist in the decomposition of what would otherwise constitute a term trade, a unique forward yield curve is generated that determines the interest rate for each of the current and forward trades. The forward yield curve is based, in part, on the overall interest rate agreed to by the parties as well as the number of days of the term and the prevailing market interest rates at the time of the trade.

31 Claims, 3 Drawing Sheets

U.S. PATENT DOCUMENTS

| | | | |
|---|---|---|---|
| 5,305,200 A | 4/1994 | Hartheimer et al. |
| 5,419,890 A | 5/1995 | Saidi |
| 5,454,104 A | 9/1995 | Steidlmayer et al. |
| 5,462,438 A | 10/1995 | Becker et al. |
| 5,497,317 A | 3/1996 | Hawkins et al. |
| 5,517,406 A | 5/1996 | Harris et al. |
| 5,557,798 A | 9/1996 | Skeen et al. |
| 5,563,783 A | 10/1996 | Stolfo et al. |
| 5,592,379 A | 1/1997 | Finfrock et al. |
| 5,649,186 A | 7/1997 | Ferguson |
| 5,675,746 A | 10/1997 | Marshall |
| 5,706,502 A | 1/1998 | Foley et al. |
| 5,710,889 A | 1/1998 | Clark et al. |
| 5,724,593 A | 3/1998 | Hargrave, III et al. |
| 5,778,157 A | 7/1998 | Oatman et al. |
| 5,787,402 A | 7/1998 | Potter et al. |
| 5,806,047 A | 9/1998 | Hackel et al. |
| 5,806,048 A | 9/1998 | Kiron et al. |
| 5,819,273 A | 10/1998 | Vora et al. |
| 5,832,461 A | 11/1998 | Leon et al. |
| 5,845,266 A | 12/1998 | Lupien et al. |
| 5,864,827 A | 1/1999 | Wilson |
| 5,890,140 A | 3/1999 | Clark et al. |
| 5,913,214 A | 6/1999 | Madnick et al. |
| 5,918,218 A | 6/1999 | Harris et al. |
| 5,922,044 A | 7/1999 | Banthia |
| 5,940,810 A | 8/1999 | Traub et al. |
| 5,944,784 A | 8/1999 | Simonoff et al. |
| 5,946,667 A | 8/1999 | Tull, Jr. et al. |
| 5,950,176 A | 9/1999 | Keiser et al. |
| 5,966,531 A | 10/1999 | Skeen et al. |
| 5,966,672 A | 10/1999 | Knupp |
| 5,966,700 A | 10/1999 | Gould et al. |
| 5,970,479 A | 10/1999 | Shepherd |
| 5,986,673 A | 11/1999 | Martz |
| 5,995,943 A | 11/1999 | Bull et al. |
| 6,006,206 A | 12/1999 | Smith et al. |
| 6,012,046 A | 1/2000 | Lupien et al. |
| 6,018,714 A | 1/2000 | Risen, Jr. |
| 6,018,721 A | 1/2000 | Aziz et al. |
| 6,023,280 A | 2/2000 | Becker et al. |
| 6,029,146 A | 2/2000 | Hawkins et al. |
| 6,029,147 A | 2/2000 | Horadan et al. |
| 6,035,287 A | 3/2000 | Stallaert et al. |
| 6,049,783 A | 4/2000 | Segal et al. |
| 6,052,673 A | 4/2000 | Leon et al. |
| 6,055,522 A | 4/2000 | Krishna et al. |
| 6,058,378 A | 5/2000 | Clark et al. |
| 6,061,662 A | 5/2000 | Makivic |
| 6,064,984 A | 5/2000 | Ferguson et al. |
| 6,073,104 A | 6/2000 | Field |
| 6,073,109 A | 6/2000 | Flores et al. |
| 6,073,115 A | 6/2000 | Marshall |
| 6,078,903 A | 6/2000 | Kealhofer |
| 6,078,914 A | 6/2000 | Redfern |
| 6,078,956 A | 6/2000 | Bryant et al. |
| 6,081,774 A | 6/2000 | de Hita et al. |
| 6,088,685 A | 7/2000 | Kiron et al. |
| 6,092,056 A | 7/2000 | Tull, Jr. et al. |
| 6,105,005 A | 8/2000 | Fuhrer |
| 6,131,082 A | 10/2000 | Hargrave, III et al. |
| 6,134,600 A | 10/2000 | Liu |
| 6,148,298 A | 11/2000 | LaStrange et al. |
| 6,173,270 B1 | 1/2001 | Cristofich et al. |
| 6,173,276 B1 | 1/2001 | Kant et al. |
| 6,178,420 B1 | 1/2001 | Sassano |
| 6,185,567 B1 | 2/2001 | Ratnaraj et al. |
| 6,195,647 B1 | 2/2001 | Martyn et al. |
| 6,226,623 B1 | 5/2001 | Schein et al. |
| 6,233,566 B1 | 5/2001 | Levine et al. |
| 6,236,972 B1 | 5/2001 | Shkedy |
| 6,236,977 B1 | 5/2001 | Verba et al. |
| 6,243,670 B1 | 6/2001 | Bessho et al. |
| 6,260,021 B1 | 7/2001 | Wong et al. |
| 6,263,321 B1 | 7/2001 | Daughtery, III |
| 6,263,335 B1 | 7/2001 | Paik et al. |
| 6,266,683 B1 | 7/2001 | Yehuda et al. |
| 6,272,474 B1 | 8/2001 | Garcia |
| 6,275,229 B1 | 8/2001 | Weiner et al. |
| 6,278,982 B1 | 8/2001 | Korhammer et al. |
| 6,282,537 B1 | 8/2001 | Madnick et al. |
| 6,285,986 B1 | 9/2001 | Andrews |
| 6,285,989 B1 | 9/2001 | Shoham |
| 6,304,858 B1 | 10/2001 | Mosler et al. |
| 6,313,854 B1 | 11/2001 | Gibson |
| 6,317,726 B1 | 11/2001 | O'Shaughnessy |
| 6,317,728 B1 | 11/2001 | Kane |
| 6,321,212 B1 | 11/2001 | Lange |
| 6,323,881 B1 | 11/2001 | Broulik et al. |
| 6,332,163 B1 | 12/2001 | Bowman-Amuah |
| 6,338,055 B1 | 1/2002 | Hagmann et al. |
| 6,338,068 B1 | 1/2002 | Moore et al. |
| 6,343,287 B1 | 1/2002 | Kumar et al. |
| 6,347,307 B1 | 2/2002 | Sandhu et al. |
| 6,349,291 B1 | 2/2002 | Varma |
| 6,356,933 B2 | 3/2002 | Mitchell et al. |
| 6,360,210 B1 | 3/2002 | Wallman |
| 6,366,908 B1 | 4/2002 | Chong et al. |
| 6,381,585 B1 | 4/2002 | Maples et al. |
| 6,381,586 B1 | 4/2002 | Glasserman et al. |
| 6,385,660 B2 | 5/2002 | Griesemer et al. |
| 6,389,413 B2 | 5/2002 | Takahashi et al. |
| 6,389,452 B1 | 5/2002 | Glass |
| 6,401,080 B1 | 6/2002 | Bigus et al. |
| 6,408,282 B1 | 6/2002 | Buist |
| 6,418,417 B1 | 7/2002 | Corby et al. |
| 6,421,653 B1 | 7/2002 | May |
| 6,424,980 B1 | 7/2002 | Iizuka et al. |
| 6,429,868 B1 | 8/2002 | Dehner, Jr. et al. |
| 6,442,545 B1 | 8/2002 | Feldman et al. |
| 6,446,110 B1 | 9/2002 | Lection et al. |
| 6,457,066 B1 | 9/2002 | Mein et al. |
| 6,460,021 B1 | 10/2002 | Kirksey |
| 6,480,882 B1 | 11/2002 | McAdam et al. |
| 6,489,954 B1 | 12/2002 | Powlette |
| 6,490,584 B2 | 12/2002 | Barrett et al. |
| 6,493,681 B1 | 12/2002 | Tertitski et al. |
| 6,510,406 B1 | 1/2003 | Marchisio |
| 6,516,303 B1 | 2/2003 | Wallman |
| 6,516,308 B1 | 2/2003 | Cohen |
| 6,523,022 B1 | 2/2003 | Hobbs |
| 6,556,987 B1 | 4/2003 | Brown et al. |
| 6,564,250 B1 | 5/2003 | Nguyen |
| 6,581,056 B1 | 6/2003 | Rao |
| 6,581,062 B1 | 6/2003 | Draper et al. |
| 6,598,028 B1 | 7/2003 | Sullivan et al. |
| 6,601,044 B1 | 7/2003 | Wallman |
| 6,611,825 B1 | 8/2003 | Billheimer et al. |
| 6,615,187 B1 | 9/2003 | Ashenmil et al. |
| 6,629,097 B1 | 9/2003 | Keith |
| 6,631,373 B1 | 10/2003 | Otani et al. |
| 6,633,868 B1 | 10/2003 | Min et al. |
| 6,711,554 B1 | 3/2004 | Salzmann et al. |
| 7,191,392 B1 | 3/2007 | Coar |
| 7,222,094 B2 | 5/2007 | Ross |
| 7,392,210 B1 | 6/2008 | MacKay et al. |
| 7,392,212 B2 | 6/2008 | Hancock et al. |
| 2001/0011241 A1 | 8/2001 | Nemzow |
| 2001/0011242 A1 | 8/2001 | Allex et al. |
| 2001/0018674 A1 | 8/2001 | Schein et al. |
| 2001/0025264 A1 | 9/2001 | Deaddio et al. |
| 2001/0032217 A1 | 10/2001 | Huang |
| 2001/0037284 A1* | 11/2001 | Finkelstein et al. ............ 705/37 |
| 2001/0042034 A1 | 11/2001 | Elliott |

| | | | |
|---|---|---|---|
| 2001/0043235 A1 | 11/2001 | Best et al. |
| 2001/0044771 A1 | 11/2001 | Usher et al. |
| 2001/0056398 A1 | 12/2001 | Scheirer |
| 2002/0002530 A1 | 1/2002 | May |
| 2002/0004777 A1 | 1/2002 | Foster et al. |
| 2002/0007335 A1 | 1/2002 | Millard et al. |
| 2002/0007358 A1 | 1/2002 | Johnson et al. |
| 2002/0013753 A1 | 1/2002 | Marks de Chabris et al. |
| 2002/0013862 A1 | 1/2002 | Orchard et al. |
| 2002/0016762 A1 | 2/2002 | Feilbogen et al. |
| 2002/0016819 A1 | 2/2002 | Sugimoto et al. |
| 2002/0018077 A1 | 2/2002 | Powlette |
| 2002/0022956 A1 | 2/2002 | Ukranincsky et al. |
| 2002/0023053 A1 | 2/2002 | Szoc et al. |
| 2002/0026405 A1 | 2/2002 | Haar |
| 2002/0026449 A1 | 2/2002 | Azencott |
| 2002/0026462 A1 | 2/2002 | Shotton, Jr. et al. |
| 2002/0029183 A1 | 3/2002 | Vlahoplus et al. |
| 2002/0032644 A1 | 3/2002 | Corby et al. |
| 2002/0035561 A1 | 3/2002 | Archer et al. |
| 2002/0042767 A1 | 4/2002 | Kwan |
| 2002/0049665 A1 | 4/2002 | Solomon et al. |
| 2002/0049666 A1 | 4/2002 | Reuter et al. |
| 2002/0054115 A1 | 5/2002 | Mack et al. |
| 2002/0059141 A1 | 5/2002 | Davies et al. |
| 2002/0065752 A1 | 5/2002 | Lewis |
| 2002/0065755 A1 | 5/2002 | Shlafman et al. |
| 2002/0069157 A1 | 6/2002 | Jordan |
| 2002/0073007 A1 | 6/2002 | Ayache |
| 2002/0078253 A1 | 6/2002 | Szondy et al. |
| 2002/0087373 A1 | 7/2002 | Dickstein et al. |
| 2002/0087454 A1 | 7/2002 | Calo et al. |
| 2002/0087455 A1 | 7/2002 | Tsagarakis et al. |
| 2002/0087457 A1 | 7/2002 | Madeley et al. |
| 2002/0099646 A1 | 7/2002 | Agarwal et al. |
| 2002/0099656 A1 | 7/2002 | Poh Wong |
| 2002/0112056 A1 | 8/2002 | Baldwin et al. |
| 2002/0123947 A1 | 9/2002 | Yuste et al. |
| 2002/0130868 A1 | 9/2002 | Smith |
| 2002/0138390 A1 | 9/2002 | May |
| 2002/0147671 A1 | 10/2002 | Sloan et al. |
| 2002/0152154 A1 | 10/2002 | Rothman et al. |
| 2002/0152156 A1 | 10/2002 | Tyson-Quah |
| 2002/0156658 A1 | 10/2002 | Selesny et al. |
| 2002/0161692 A1 | 10/2002 | Loh et al. |
| 2002/0161853 A1 | 10/2002 | Burak et al. |
| 2002/0169707 A1 | 11/2002 | Koek et al. |
| 2002/0174043 A1 | 11/2002 | Gilbert et al. |
| 2002/0178096 A1 | 11/2002 | Marshall |
| 2002/0184132 A1 | 12/2002 | Foster |
| 2002/0184237 A1 | 12/2002 | McFeely |
| 2002/0194097 A1 | 12/2002 | Reitz |
| 2002/0194114 A1 | 12/2002 | Erdmier |
| 2003/0004942 A1 | 1/2003 | Bird |
| 2003/0009411 A1 | 1/2003 | Ram et al. |
| 2003/0018558 A1 | 1/2003 | Heffner et al. |
| 2003/0018714 A1 | 1/2003 | Mikhailov et al. |
| 2003/0033212 A1 | 2/2003 | Sandhu et al. |
| 2003/0037174 A1 | 2/2003 | Lavin et al. |
| 2003/0065594 A1 | 4/2003 | Murphy |
| 2003/0066025 A1 | 4/2003 | Garner et al. |
| 2003/0066032 A1 | 4/2003 | Ramachandran et al. |
| 2003/0078869 A1 | 4/2003 | Williams |
| 2003/0088496 A1 | 5/2003 | Piotrowski |
| 2003/0093360 A1 | 5/2003 | May |
| 2003/0093362 A1 | 5/2003 | Tupper et al. |
| 2003/0093565 A1 | 5/2003 | Berger et al. |
| 2003/0105981 A1 | 6/2003 | Miller et al. |
| 2003/0115122 A1 | 6/2003 | Slater et al. |
| 2003/0126063 A1 | 7/2003 | Reuter |
| 2003/0126068 A1 | 7/2003 | Hauk et al. |
| 2003/0126069 A1 | 7/2003 | Cha |
| 2003/0126117 A1 | 7/2003 | Megiddo et al. |
| 2003/0140035 A1 | 7/2003 | Burrows |
| 2003/0149653 A1 | 8/2003 | Penney |
| 2003/0154071 A1 | 8/2003 | Shreve |
| 2003/0158949 A1 | 8/2003 | Miller et al. |
| 2003/0163401 A1 | 8/2003 | Dines et al. |
| 2003/0188255 A1 | 10/2003 | Shimizu et al. |
| 2003/0220861 A1 | 11/2003 | Broms et al. |
| 2003/0220868 A1 | 11/2003 | May |
| 2003/0233459 A1 | 12/2003 | Miller et al. |
| 2003/0236862 A1 | 12/2003 | Miller et al. |
| 2003/0236957 A1 | 12/2003 | Miller et al. |
| 2004/0039666 A1 | 2/2004 | Fudali et al. |
| 2004/0064397 A1 | 4/2004 | Lynn et al. |
| 2004/0078248 A1 | 4/2004 | Altschuler |
| 2004/0103003 A1 | 5/2004 | Mayers et al. |
| 2004/0148247 A1 | 7/2004 | Miller et al. |
| 2004/0162775 A1 | 8/2004 | Winklevoss et al. |
| 2004/0167850 A1 | 8/2004 | Dreyer et al. |
| 2004/0215553 A1 | 10/2004 | Gang et al. |
| 2004/0220885 A1 | 11/2004 | Salzmann et al. |
| 2004/0225596 A1 | 11/2004 | Kemper et al. |
| 2005/0060256 A1 | 3/2005 | Peterson et al. |
| 2005/0086148 A1 | 4/2005 | Woodruff et al. |
| 2005/0086170 A1 | 4/2005 | Rao |
| 2005/0102213 A1 | 5/2005 | Savasoglu et al. |
| 2005/0102214 A1 | 5/2005 | Speth et al. |
| 2007/0043654 A1 | 2/2007 | Libman |

FOREIGN PATENT DOCUMENTS

| | | |
|---|---|---|
| WO | WO 01/20530 | 3/2001 |
| WO | WO 01/37540 | 5/2001 |
| WO | WO 01/57716 | 8/2001 |
| WO | WO 01/59670 | 8/2001 |
| WO | WO 02/03774 | 1/2002 |
| WO | WO 02/14991 | 2/2002 |
| WO | WO 02/054189 | 7/2002 |
| WO | WO 02/056146 | 7/2002 |
| WO | WO 02/063516 | 8/2002 |
| WO | WO 02/065278 | 8/2002 |
| WO | WO 02/065286 | 8/2002 |
| WO | WO 03/012588 | 2/2003 |
| WO | WO 03/030013 | 4/2003 |
| WO | WO 03/032158 | 4/2003 |
| WO | WO 03/065256 | 8/2003 |
| WO | WO 03/102733 | 12/2003 |

OTHER PUBLICATIONS

Michael Hernan☐☐The Morning Call, Business Section, Dec. 6, 1992, p. D.01.*
Counterparty Risk Management Policy Group (CRMPG)☐☐"Improving Counterparty Risk Management Practices"☐☐Jun. 1999.*
Financial Accounting Standards Board (FASB)☐☐"FASB Interpretation No. 41"☐☐Dec. 1994.*
Manco et al., A Framework For Adaptive Mail Classification, 14th IEEE Conference on Tools with Artificial Intelligence (ICTAI'02), Nov. 4, 2002, p. 387.
Silverman, A new strategy for giving away your money, Wall Street Journal, D1, Oct. 6, 2004.
Czejdo, Automatic generation ontology based anntations in XML and their use in retrieval systems, Web Information Systems Engineering, 2000, Proceedings of the First International Conference, Jun. 19, 2000, p. 296.
Novell, Inc., Beginning of Viewing Information and Viewing Basic Information about a print job.
Block Trades Market Practice, Apr. 1, 2003, pp. 1-10.
Chacko, Cephalon, Inc. Taking Risk Management Gherory Seriously.
Kus, Contingent capital: just in the capital management sets a new standard; Sponsored statement.
Electronic Trading Tools.
Martin, Email Report, Issue 11, Aug. 16, 2001, printed Aug. 2, 2005.

Fast Email Extractor 4.4.

Form 10-K, United States Securities and Exchange Commission, no date,year ending Dec. 31, 2003.

Pila, In Case Of Emergency; contingent capital.

Intellseek and Inxight Partner to Provide New Business Intelligence Solutions, www.inxight.com/news/021029_intelliseek.html, Oct. 29, 2002.

Unknown, Investigating Systems.

May, Modeling and Querying Structure and Contents of the Web, 10th International Workshop on Database & Amp; Expert Systems Applications, Sep. 1, 1999, p. 721.

Rupali et al., Phrase-based Text Representation for Managing the Web Documents.

Lam et al., Querying Web Data—The WebQA Approach.

Rising to the challenge of global STP, Euromoney Publications PLC Global Inventor, Nov. 1, 1999, pp. 51-52; Issn. 0951-3604.

STP in the Bond Market?, Wall Street & Technology, Dec. 1, 2002, p. 20.

Ericson, Softwerc releases patent-pending.

IBM Corp., Strict Read Order Control for a Queing System.

Carchiolo et al., Structuring the Web.

Witten et al., Text Mining: A New Frontier for Lossless Compression.

Fan et al., The Internet and Future Financial Markets; Industry Trend or Event, Association for Computing Machinery, Inc., Sec. 11, vol. 43; Nov. 1, 2000, p. 82; Issn: 0001-0782.

Emery, et al., The Measurement of Liquidity, Journal of Accounting Research, vol. 20, No. 2, Part 1, p. 290-303, Autumn 1982.

Calado, The Web-DL Environment for Building Digital Libraries from the Web.

Ribiero-Neto et al., Top Down Extraction of Semi-Structured Data, String Processing and Information Retrieval Symposium & amp.

Roberts, Top Priority on Bottom Line: More Companies Seeting to Manage Business Risks.

TradeWeb's STP vision, Euromoney Institutional Investor PLC, Sec. 406, vol. 34, Feb. 1, 2003, p. S6; Issn: 0014-2433.

Elkayam, Using Indexed Bonds.

Myllymaki, With Standard XML Technologies.

Hewlett-Packard, x4queview.org.

Freddie Mac's document custody procedure overview—2003.

* cited by examiner

SYSTEM AND METHOD FOR MANAGING A SERIES OF OVERNIGHT FINANCING TRADES

CROSS REFERENCE TO RELATED APPLICATIONS

This application is based on and claims priority to U.S. Provisional Application No. 60/284,158, filed Apr. 16, 2001 entitled TRADECALC: MANAGING A SERIES OF OVERNIGHT FINANCING TRADES.

FIELD OF THE INVENTION

The present invention generally relates to systems and methods for managing securities trading operations, and more particularly to systems and methods for managing a series of financing transactions that are initially presented to market participants in one bundled (single) expression of risk.

BACKGROUND OF THE INVENTION

Corporations, financial institutions and individuals have short term cash needs, where "short term" is defined as less than a year, and often solely for a period of a few days or weeks. These short term cash borrowing entities typically have securities (e.g., bonds, notes) that can be sold as collateral, subject to an agreement to repurchase, in order to secure the short term borrowing of the cash. In addition to the borrowing entities that require the short term use of cash, there are other entities (lending entities) that have cash available to lend to others for such short periods of time (e.g., a corporate treasurer who has excess cash that must be invested for a short term) and desire to secure that short term investment with marketable securities, subject to an agreement to resell the securities to the borrowing entity. Interest is paid by the cash borrowing entity to the cash lending entity for the use of the borrowed cash. The interest is usually paid on the maturity date of the borrowing (i.e., the repurchase date).

These short term financing arrangements as described above have historically been called "repo" and "reverse repo" transactions. "Repo" is an abbreviation for repurchase, as in a repurchase of the security. The act of short term borrowing of money in return for the payment of interest and the selling of securities subject to a repurchase of equivalent securities is known as a repo transaction. The complementary act of short term lending of money against a purchase of securities subject to an agreement to resell equivalent securities, and the receipt of interest payments is known as a reverse repo transaction. The party selling the security and agreeing to repurchase an equivalent security is said to engage in a repo transaction and its counterparty engages in a reverse repo transaction. Accordingly, for each repo transaction, there is a reverse repo transaction.

Other economically equivalent securities financing transactions that involve similar transfers of securities with an obligation on the part of the transferee to transfer back to the transferor are: (1) securities loan and securities borrow transactions; (2) buy/sellback or sale buyback transactions; and (3) spot sale with simultaneously executed forward sale transactions. Although not referred to individually in this application, the terms repo and reverse repo as used herein are meant to cover all such similar securities financing transactions that are subject to Financial Accounting Standards Board ("FASB") Interpretations FIN 41, as more fully described below.

It is possible that the cash lending party and the cash borrowing party communicate and transact directly with each other. Typically, however, the borrowing/lending parties use dealers, brokers and/or broker dealers in the transaction. Dealer to dealer transactions most frequently occur through Interdealer Brokers ("IDBs"). If dealers were to communicate directly with each other, each party knows the identity of the other party, and the economic leverage of one party over the other may be such that acceptable financial terms cannot be reached. Dealers, thus, often use brokers in a blind arrangement in which the two parties do not know the identity of other party to whom they are submitting bids/offers (i.e., the borrower does not know the lender in the bid/offer process and vice versa).

Repo transactions have both accounting and tax implications that vary depending on the applicable accounting and tax regimes. Under U.S. Generally Accepted Accounting Principles ("GAAP"), if the term for the repo and reverse repo transactions match (e.g., both have a 10 day maturity), are with the same counterparty, involve securities that transfer on a net settlement system and are subject to an enforceable netting contract, there is no net effect on the assets or liabilities of either of the parties, and neither of the transactions are required to be reported on the balance sheet of either of the parties. Conversely, if the terms of the two transactions do not match (e.g., the repo transaction is for 5 days and the reverse repo transaction is for 10 days) under GAAP the outstanding transaction must go on the balance sheets of the GAAP reporting entities. The rules for balance sheet netting of securities financing transactions under GAAP are set forth in FIN 41. FIN 41 sets forth the terms and conditions for allowing balance sheet netting of securities financing trades executed with the same counterparty and end dates.

FIG. 1 illustrates one repo and reverse repo transaction according to the prior art. In this example, Party A 100 and Party B 110 illustrate two principals to the transaction. If the principals 100,110 are both netting members of the Government Securities Clearing Corporation ("GSCC") (not shown in this Fig.) which performs comparison, netting and settlement services for the repo market, and the securities are of the type accepted for matching at the GSCC, the trade would be submitted to the GSCC in order for GSCC to compare and step in as a novated principal to both parties 100, 110. In the first transaction, the "start leg" 120, Party B 110 is said to be executing a repo in that it is selling securities (such as 10 year U.S. treasury note) in return for proceeds of a principal amount of cash. From the perspective of Party A 100, it executes a reverse repo transaction in that it is exchanging the principal amount of cash in return for the purchased securities and agreed upon interest payments. At the end of the term of the repo and reverse repo transactions, the "end leg" 130, the purchased securities are returned to Party B 110 and Party B 110 returns the proceeds as well as the agreed upon interest on the principal amount of cash. Typically this interest is paid at the end of the term of the contract.

FIG. 1 illustrates one transaction, a repo from the viewpoint of Party B 110 and a reverse repo from the viewpoint of Party A 100. In order for FIN41 to apply, each of these parties 100, 110 must execute at least one additional transaction where their roles are reversed, i.e., where Party B 110 does a reverse repo and Party A 100 does a repo. FIN41 sets forth criteria for netting the repos and reverse repos (as well as other securities financing transactions) that a single counterparty such as Party A 100 executes with another single counterparty such as Party B 110.

As stated above, if the terms of the repo and reverse repo transactions match, and other FIN41 criteria are met, there is no net effect on the balance sheets of the entities 100 and 110 under GAAP. Under FIN41, however, if the terms of the transactions are not identical, the transactions must be reported on the balance sheets of the parties (i.e., as an asset or a liability as appropriate). Securities financing trades are typically subject to daily margin call rights based upon the fluctuations in the market value of the purchased securities, but margining of interest rate fluctuations is not customary due to the short term nature of the transactions. Daily collateral price movements and interest rate fluctuations can pose a considerable amount of counterparty credit risk for large and long term transactions.

Accordingly, it is an object of the present invention to provide for increased balance sheet netting under GAAP and a reduction of some of the credit risks associated with the prior art method of managing financing trade contracts as discussed above.

SUMMARY OF THE INVENTION

The present invention is a system and a method for managing securities financing trades. In contrast to the prior art method of formulating and executing these trades, the present invention decomposes what would have been executed as a typical prior art term trade (e.g., 10 days) (hereinafter known as a CON trade (Consolidated) into a series of several shorter term financing trades (e.g., several separate and distinct overnight trades or trades that have shorter maturities than the proposed CON trade with a final maturity date equal to the maturity date of the proposed CON trade). This method for managing and executing financing trades, as well as the system for performing such management, increases balance sheet netting opportunities through the use of trade netting under the guidelines of FIN41. In addition, separation of what otherwise would be booked as a longer term transaction into multiple transactions could lead to improved margining practices and procedures.

The system decomposes the original proposed CON trade, for which the parties submit bids and offers, but do not technically execute, into one current trade (assuming today is first day the parties agree for the execution of the trade) and a plurality of forward trades. The current trade is forwarded to the parties for execution and booking, while the forward trades are both forwarded to the parties for execution and booking and are held by the system of the present invention until their respective future settlement dates.

In order to assist in the decomposition of the proposed CON trade, the present invention provides a unique forward yield curve that determines the interest rate for each of the forward trades. The forward yield curve is based, in part, on the interest rate agreed to by the parties, as well as the number of days of the term and the prevailing market rate at the time of the trade. In a preferred embodiment, the forward yield curve is determined by interpolation.

The interest rates that are attached to each of the forward trades in accordance with the present invention are "on market." In accordance with market convention, the interest must be paid ("cleaned up") when each trade ends. Accordingly, as each trade is concluded, the repo interest is paid to the appropriate party, which allows that party to reinvest that interest. The original purchased securities will be the subject securities in the next trade, unless otherwise assigned by the repo buyer and the repo seller. The above described yield curve derived on the date and time that the first forward trade is executed is used to calculate the interest rate for each forward trade.

BRIEF DESCRIPTION OF THE DRAWINGS

For the purposes of illustrating the present invention, the drawings reflect a form which is presently preferred, it being understood however, that the invention is not limited to the precise form shown by the drawings in which.

DETAILED DESCRIPTION OF THE INVENTION

Figure 1:
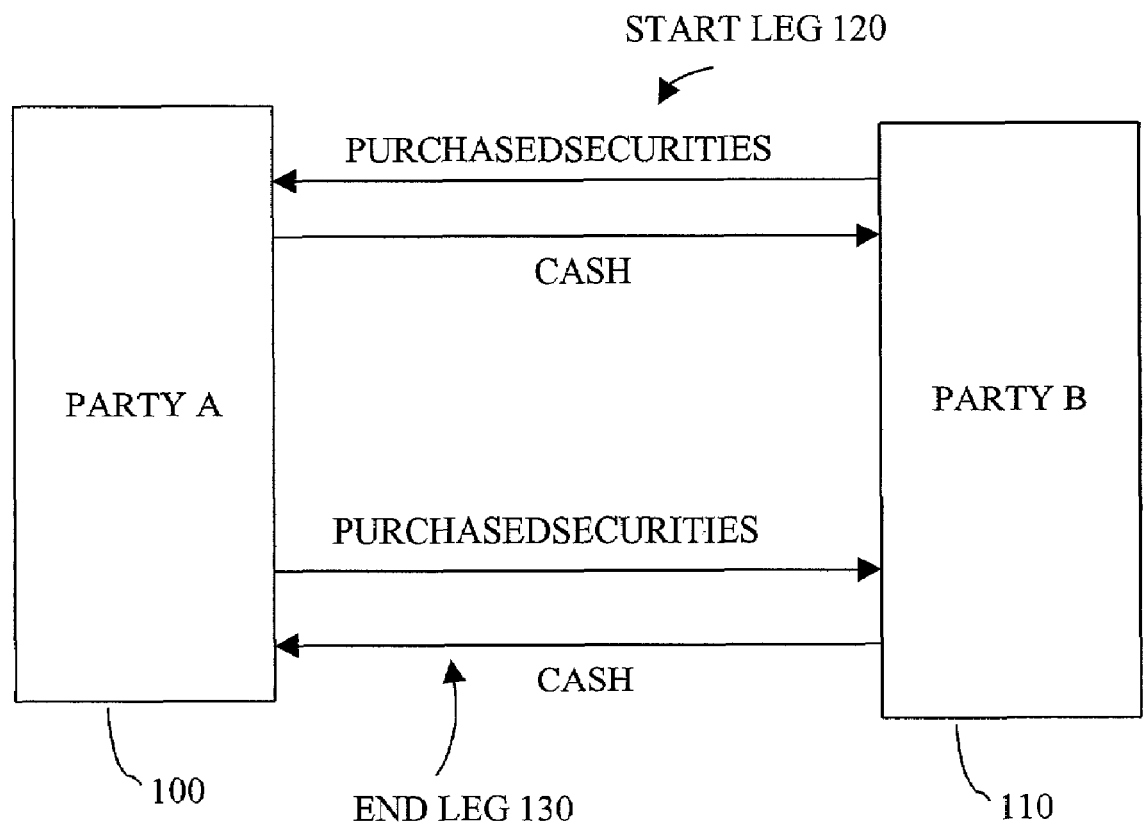
FIG. 1 illustrates a financing trade of the prior art.
Figure 2:
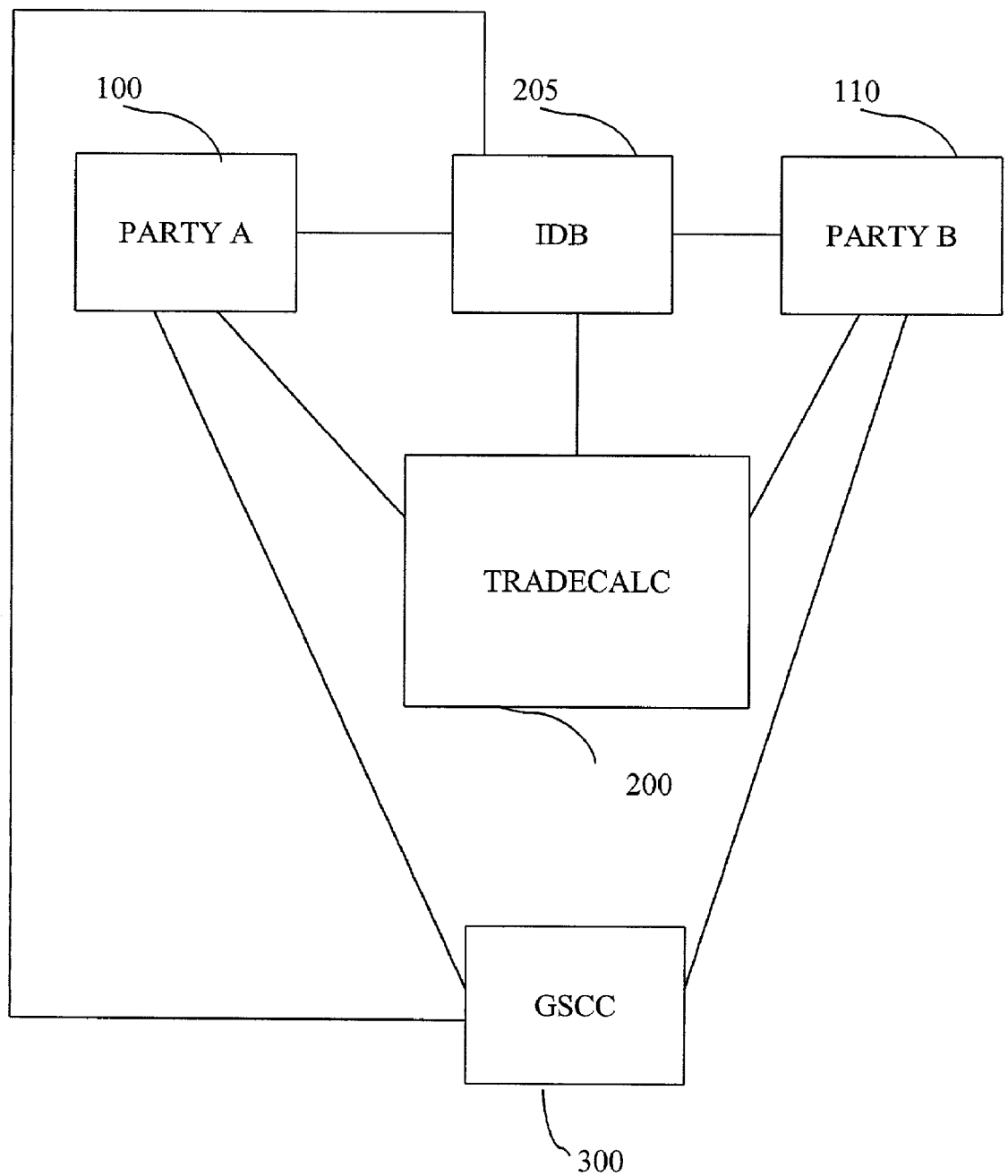
FIG. 2 illustrates a configuration including the system of the present invention for managing financing trades.

FIG. 2 illustrates the system of the present invention 200 in a typical configuration for managing financing trades. As shown in FIG. 1, there are two parties to the transaction 100 and 110. As with the prior art, these parties 100, 110 negotiate a financing trade intended to be executed as a series of trades for particular securities and with a final termination date. The example assumes that the decomposed trades are overnight trades. As previously described, this negotiation is typically conducted through a bid/offer process using brokers, such as an Interdealer Broker (IDB) 205.

In a preferred embodiment, GSCC netting members 100, 110 and IDB 205 have electronic connections to system 200 of the present invention. This electronic connection can be through a secure dial-up connection, a Virtual Private network (VPN) or through secured Internet sessions. System 200 provides customized user interface screens for the parties 100, 110, 205 to interact with system 200. The devices used by parties 100, 110, 205 to connect to system 200 can be stand alone devices (e.g., personal computers) but are most preferably internally networked devices which communicate with system 200 through a communication link as described above.

Once the parties 100, 110 have come to an agreement with respect to the proposed financing transaction, they and their IDB 205 separately submit their proposed trades to system 200. Upon receipt of the proposed trades system 200 determines whether the required data fields are present and properly formatted. The required data fields preferably include the type of trade, the market indicator such as General Collateral ("GC")or Special, the security type and maturity range for GC trades, a valid CUSIP number for the initial transaction, a valid start and final transaction end date against a holiday calendar, par value, interest rate, principal amounts and the par fill or money fill indicators. CUSIP stands for Committee on Uniform Securities Identification Procedures and a CUSIP number is a unique nine-character identification for each security approved for trading in the U.S. Uniform CUSIP numbers facilitate the clearing and settlement process for the trading of securities.

If there are any missing data fields or improperly formatted fields, system 200 rejects the proposed trade and sends it back to the originator 100 or 110 with appropriate error messages. If the trades have been properly validated, system 200 attempts to match the trades by searching for an equal but opposite side trade from the counterparties. Most commonly, trades are executed with the use of an IDB 205. In a proposed trade using an IDB 205, the IDB 205 is a "riskless principal" counterparty to the two dealers that propose to enter into the trades. Accordingly, four proposed trades are actually submitted to the system 200: the IDB 205 separately submits its two proposed trades, one with Party A 100 and one with Party B 110; and each of the parties 100, 110 submits its respective proposed trades with the IDB 205 to system 200. System 200 ensures that each party reports that they wish to enter into a trade with the IDB 205, and the IDB 205 reports that it wishes to enter into one trade with each party. System 200 matches all 4 proposed trades. If the proposed trades are not done through an IDB 205, and are done dealer direct, then each dealer submits their proposed trade to the system, and the system matches the two proposed trades submitted by the separate dealers. Preferably, the proposed trades submitted by the three parties 100, 110, 205 to system 200 accurately reflect the agreement previously made between them. In such a case, the proposed trades are immediately matched by system 200. In the event that a particular proposed trade is not matched, system 200 stores the proposed trade and continues to attempt to match the proposed trade throughout the day (preferably at predetermined intervals). System 200 maintains a cutoff time (known to all the parties 100, 110, 205) by which all unmatched proposed trades are returned to the originating source 100, 110 or 205 with a notification that the proposed trades are no longer available for matching/execution by system 200.

FIG. 2 additionally shows the connection between the parties 100, 110 and the GSCC system 300. As previously described, system 200 communicates the decomposed trades to the parties 100, 110 for booking and execution. The parties 100, 110 then in turn, submit the trades to the GSCC 300 for netting and settlement as will be further described below.

Figure 3:
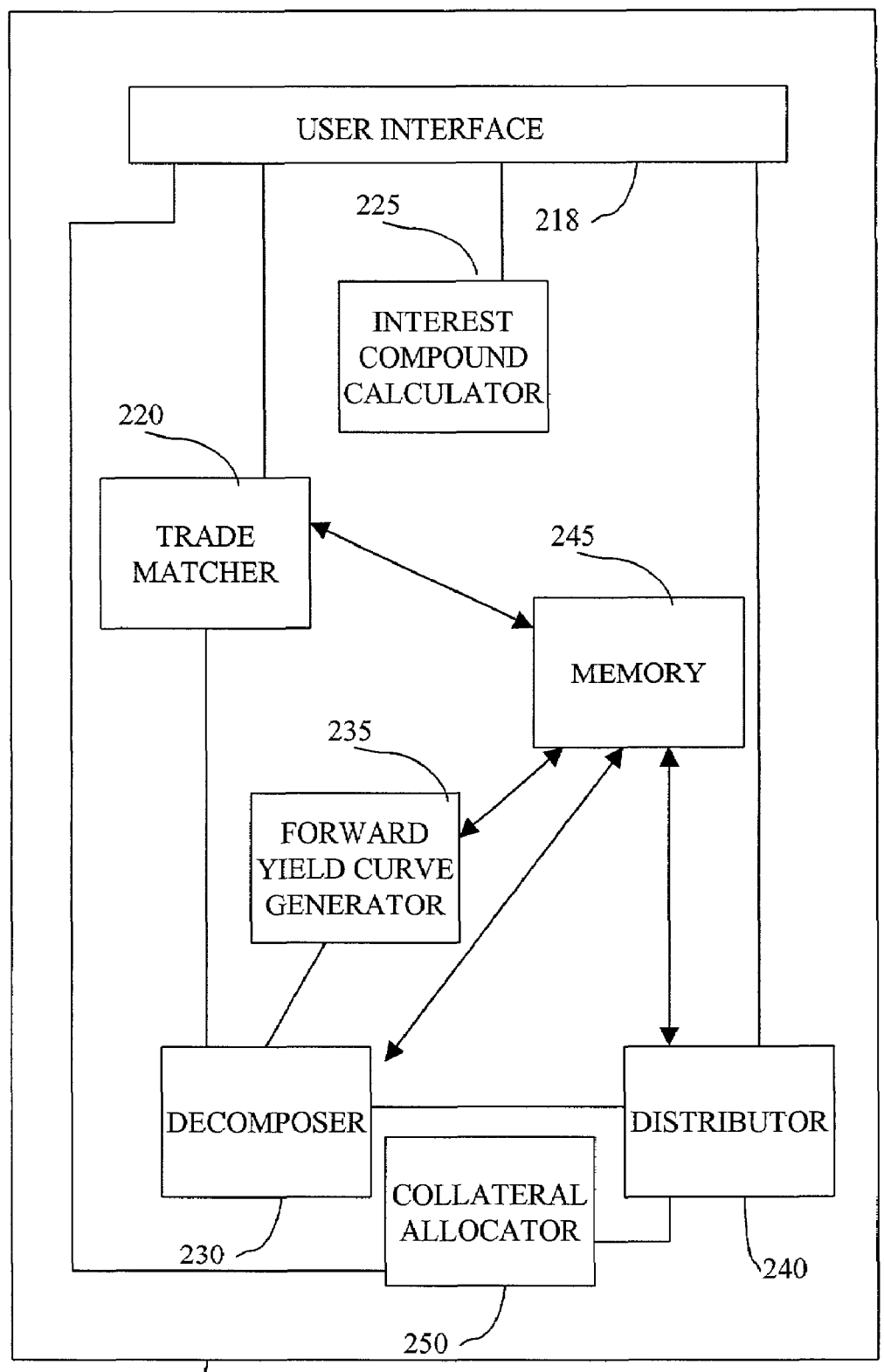
FIG. 3 depicts the system of the present invention.

FIG. 3 illustrates some of the significant components of the system 200 of the present invention. User Interface 218 provides the interface between system 200 and the users. Trade Matcher 220 performs the trade matching process as described above. The Interest Compound Calculator 225 determines the impact of compounding the daily interest over the life of the trade as a result of having to clean up interest daily. As further described below, the Calculator 225 can be used by the parties 100, 110 in formulating the compounded interest rate for the original proposed CON trade. The Decomposer component 230 performs the actual decomposition of the original proposed CON trade into the separate decomposed trades. If the original proposed CON trade is to start on the current day, then the Decomposer 230 generates one current and at least one forward trade. Distributor 240 is used for storing each of the generated forward trades (in memory 245) and for transmitting the individual forward trades to the parties 100, 110 for execution. The Memory 245 serves as storage for the trades as well as storage for other data as required by the other components of the system 200 of the present invention.

As appreciated by those skilled in the art, there are numerous ways in which system 200 can be constructed and configured. In a preferred embodiment, system 200 is a client server base system with the separate applications 220 through 240 operating on one or more application servers, and with all of the data required to operate system 200 residing on a database server. Alternatively, system 200 can be configured in a single machine or be constructed using separate stand alone processors with appropriate communication links.

As briefly described above, the Interest Compound Calculator 225 can be used by the parties 100, 110 in order to compute the effect of the compounding of the reinvestment of the daily interest paid on the series of forward trades. This effect is preferably taken into account by the parties when they negotiate the interest rate to be applied to the proposed trade submitted to System 200 for decomposition. This reinvestment opportunity is a significant feature of the present invention as the decomposition of the overall trade into individual forward trades, which provide cleanup of the interest on a daily basis, allows reinvestment of that interest on a daily basis. This reinvestment opportunity should be taken into account by the parties 100, 110 when negotiating the Con trade, specifically with respect to the negotiated interest rate.

In order to use the Calculator 225, parties 100, 110 communicate with the Calculator 225 through User Interface 218 (preferably from a workstation located on their trading desk) and enter the requisite data into system 200. System 200 verifies the data, and if requisite data is missing or incorrect, system 200 returns the submission to the party 100, 110 with the appropriate error messages. In a preferred embodiment, the requisite data includes the bid or offer (or both), the security type, the maturity range of securities for GC trades (e.g., under 10 years), the specific CUSIP number for "special" trades, the start date, the end date, and a reinvestment rate. The reinvestment rate is the rate at which the submitting party believes it will be able to reinvest the daily interest payments for the duration of the series of decomposed trades. In one embodiment of the present invention, the reinvestment rate can be stipulated as either LIBOR (6:30 AM, New York time), Fed Funds (telerate feed), or a GC repo rate or a specific customized rate.

Calculator 225 returns to the party 100,110, a modified interest rate that takes into account the effect of the daily reinvestment of the daily interest payments. For example, a proposed CON trade is submitted to the Calculator 225 and has an interest rate of 1.73 and final maturity of ten days. The trader 100,110 additionally specifies a reinvestment rate source of LIBOR. Calculator 225 then performs an interest compounding calculation and determines that the interest rate that should be applied to the proposed CON trade (taking into account the reinvestment opportunity) is 1.75. The trader 110, 110 can then take this calculated rate and enter it as a bid/offer for proposed CON trades.

The Forward Yield Curve Generator 235 is employed to generate a forward yield curve. This forward yield curve creates "on market" rates that can be applied to forward trades. The Generator 235 generates the forward yield curve by interpolating daily "on market" rates from an agreed upon pricing source. In one embodiment, pricing can be based upon an average of repo bid and offer data collected from several dealers, since there are no independent published repo pricing sources currently available. Other options for pricing may be derived from LIBOR or Fed Funds rates as published. Furthermore, it is possible to use different pricing sources, depending on the particular market. For example, the GC market might use LIBOR, and the Specials market might use dealer submitted bids/offers.

Rates can be entered into system 200 through interface 218 by dealers 100, 110 for specific maturity ranges and securities types in the term GC market and for specific CUSIPs in the term Specials market. In order to compute a valid dealer average, it is preferred that at least three dealers submit bids and offers at the specified time interval. A maximum one time average curve is maintained for every time interval submitted by these dealers. In one embodiment of the present invention, broker dealers 100, 110 submit market rates every 5 minutes, and the Forward Yield Curve Generator 235 generates a one year interpolated forward yield curve every 5 minutes. The time selected to initiate forward trades against the "latest market" curve is the time stamp of when a proposed trade is received by system 200. Assuming, for example, that the time interval for computing average market curves (i.e., a forward yield curve) is every 5 minutes, forward trades generated for a proposed CON trade bid submitted at 10:14 AM are aligned against the market curve generated at 10:10 AM.

Table one below illustrates an example of a forward yield curve for a term of 6 days. The RATE column is the interpolated rates derived from average rates submitted by dealers for stipulated time intervals (e.g., overnight, 1 week, 2 week, 1 month, etc.). A linear interpretation rate is derived from the time intervals in between the stipulated time intervals by using the following:

Linear Rate=[Term rate(T)−Term rate(t)]/[T−t]*(Day−1)+Term rate(t) (where T, t are term maturities and T>t.)

The F-O/N column represents the forward interpolated rate for each daily interval out the curve. This rate is determined by using the following:

Forward Rate=[Term rate(T)*T−Term rate(t)*t]/[T−t] where T, t are term maturities and T>t.

The rate in the F-O/N column is applied to the decomposed trades.

TABLE 1

| DATE | DAYS | RATE | F-O/N |
|------|------|------|-------|
| Oct. 05, 2001 | 1 | 2.5000 | 2.5000 |
| Oct. 06, 2001 | 2 | 2.4917 | 2.4833 |
| Oct. 07, 2001 | 3 | 2.4833 | 2.4667 |
| Oct. 08, 2001 | 4 | 2.4750 | 2.4500 |
| Oct. 09, 2001 | 5 | 2.4667 | 2.4333 |
| Oct. 10, 2001 | 6 | 2.4583 | 2.4167 |

Decomposer 230 is one of the most significant elements of the present invention. It is the function of Decomposer 230 to decompose the original proposed CON trade into a series of trades, including a current trade (if the start date is the current day) and a series of forward trades. Once the Trade Matcher 220 has matched the proposed trades submitted by the parties 100, 110 (205), the Decomposer 230 begins its decomposition process. The first task undertaken by Decomposer 230 is to generate the forward yield curve that is used to determine the "on market" rates that are to be applied to the forward trades. In order to accomplish this function the Decomposer 230 invokes the Forward Yield Curve Generator 235.

As described above, the Generator 235 generates an interpolated forward yield curve from the most current market curve available at the time of the trade conversion. The main factors in generating this forward yield curve are the rate for the original CON trade agreed to by the parties 100, 110 as well as the number of days of the trade. Using this data, plus the data as described above, the Generator 235 returns the forward yield curve to the Decomposer 230 for the generation of the current trade as well as the series of forward trades. As further described above, the forward yield curve generated by the Generator 235 contains only "on market" rates that are in compliance with GAAP.

Once it has obtained the forward yield curve, the Decomposer 230 then generates the current trade and the series of individual forward trades. The current and forward trades have start and end dates that commence and end in accordance with the parameters of the original proposed CON trade. For example, if the proposed trade was for a 3 day term that started today, and the parties had specified overnight trades in their original proposed CON trade, Decomposer 230 generates one current overnight trade that starts today and ends tomorrow; a first forward overnight trade that starts tomorrow and ends the following day; and a second forward trade that starts two days from today and ends three days from today. The interest rate for each of the trades is determined by the forward yield curve containing the representative forward, "on market" rate. The current overnight trade thus has a current overnight market rate, the 1 day forward trade would have the 1 day forward market rate, and the second forward day trade would have the second day forward market rate.

Decomposer 230 additionally maintains a predetermined average trade tolerance level of the major dealers such as dealers 100, 110 for trade amounts within specific security types and maturity ranges in the GC market and Specials market. These tolerance levels are matched against the proposed CON trade levels and help prevent the decomposition of proposed CON trades into executed trades with repo rates that fall outside of the tolerance. If the decomposed rates fall outside of the tolerance, they will be considered "off market" trades and therefore ineligible for decomposition.

Market tolerances are input by the dealers at specific time intervals. Again, at least three dealers must submit tolerances for the tolerance level to be considered valid. Tolerances are represented in basis points by the type of market (GC and Special) and by a range of notional trade sizes. For example, GC trades in the under 2 year security for a 1 week term whose notional trade amount is between 25 and 50 million, might have an average tolerance level of 15 basis points. If the rate on the proposed CON trade is higher or lower then the average rate of the 7 days worth of interpolated forward yield curve rates for the 2 year GC market by 15 basis points, the CON trade is rejected as not being eligible for decomposition and execution (i.e., it is "off market"). If the overall trade is within the predetermined average tolerance, Decomposer 230 determines the difference between the actual rate of the overall trade and the average rate of the interpolated rates for the duration of the trade, divides the results by the number of days of the overall trade, and adds the result to the rate of each of the individual rates of the forward trades. This process by the Decomposer 230 ensures that the economics of the trade are held consistent among all of the forward trades throughout the life of the trade.

Once the Decomposer 230 has generated the current day trade (assuming the trade is to start today) and the series of forward trades, it passes on the trade information for the generated series of trades to Distributor 240.

It is the function of Distributor 240 to distribute each of the decomposed trades to the parties 100, 110 and 205 for eventual submission by the parties to the GSCC 300 for netting and settlement. In a preferred embodiment, the Distributor 240 distributes the all of the decomposed trades, in bulk, to the two parties 100, 110, as well as to the IDB 205.

As described above, the function of the GSCC 300 is both a netting and a clearance process for the repo market. In one embodiment of the present invention, system 200 transmits all of the forward trades to the participants 100, 110, 205 once they have been generated, and the parties 100, 110 and 205 immediately submit all of the trades (including the forward trades) to the GSCC 300. In an alternative embodiment, the decomposed trades are again transmitted to the participants 100, 110, 205 all at once for purposes of booking the transactions, but the parties 100, 110 and 205 transmit the forward trades to the GSCC 300 only when appropriate for netting and settlement.

Each forward trade created by the Decomposer 230 stands on its own, and can therefore be canceled or be corrected independently of any of the other forward trades. Traders 100, 110 and the IDB 205 have the ability to enter either a cancellation or a correction transaction into system 200 from their work stations. At a minimum, the trader 100, 110, 205 must enter the unique trade ID of the trade that is to be affected.

If the transaction requested by the trader 100, 110 is a cancellation, the trade ID is the only piece of data required. If the transaction is a correction, additional data such as the principal amount is required. The rates for the forward trades, however, cannot be revised as the Decomposer 230 used the Forward Yield Curve Generator 235 to generate "on market" interest rates. Accordingly, changes in the interest rates would create "off market" transactions.

As with the original proposed CON trade, each cancellation or correction transaction must be matched by a corresponding transaction from the counterparty. If the cancellation or correction transaction is not matched by the cut-off time as previously described, it will not be affected with respect to the next forward trade. As with the original trades, system 200 attempts to match the cancellation/correction transaction throughout the day (at predetermined intervals). At the end of the cut-off time, any unmatched transactions are sent back to the originator 100, 110 or 205.

Once a correction or cancellation transaction has been matched, system 200 transmits the cancellation or correction back to the participants' 100, 110, 205 trading systems. A straight cancellation of a trade results in an elimination of the trade from the entire spectrum of the participant's books and records processing. The trade is preferably eliminated from position, P&L and risk management records, settlement and clearance projections and processing, regulatory record keeping and reporting, and general ledger postings of the counterparties. In effect, a cancellation by system 200 takes on the typical cancellation process of any trade being canceled in the participants' trade capture and processing systems.

Similarly, with respect to corrections, these matched and executed corrections follow the same process as any other trade correction process. In other words, the trade being corrected would be removed from the participant's books and records, and the "new" trade information is processed through the firm's books and records. The onus is on the participants to process the cancellation and correction transactions through its own books once it is received the revised transactions from system 200.

System 200 provides parties 100, 110, 205 with the ability to allocate different types of purchased securities to the forward GC trades that have been created by the repo counterparty by a certain cut off time.

Once system 200 accepts an allocation transaction it notifies the reverse repo counterparty who is on the other side of the trade. If accepted, the reverse repo counterparty must agree to the allocation by a certain agreed upon cut-off time, the allocation transaction will not be in effect for the next forward trade. System 200 stores the allocation transaction in memory 245 and continues to attempt matching throughout the day (at predetermined intervals). There is an agreed upon cutoff time (which is a system 200 changeable parameter) by which all unmatched allocation transactions are returned to the originating source notifying them that they are no longer eligible for allocation. All the data, other than the par value of the securities of the price of the underlying, that is in effect on the current forward remains in effect for subsequent forward trades. Notification of unmatched substitution transactions is sent back to the originating parties 100, 110, 205. Once matched, system 200 transmits, in real time, the substitution transaction back to the trading systems of the participants 100, 110, 205.

For trades due to settle on a particular day, the repo participant enters through the User Interface 218 collateral assignment information which consists of CUSIPs, par or money and the market price of the CUSIPs. The Collateral Allocation 250 validates the price of the CUSIPs, and if approved, creates the starting trade and cancel the original due to settle transaction by notifying each of the parties 100, 110, 205.

Although the present invention has been described in relation to particular embodiments thereof, many other variations and other uses will be apparent to those skilled in the art. It is preferred, therefore, that the present invention be limited not by the specific disclosure herein, but only by the gist and scope of the disclosure.

We claim:

1. A computer-implemented method of managing financing trades, the method comprising:
   receiving, using at least one user interface device, an original proposed financing trade, the original proposed financing trade comprising a proposed repo trade having a term of a recited number of days starting on a current day;
   decomposing, using at least one computer processor, the original proposed financing trade into a series of decomposed trades with a final maturity of a final trade equal to the term of the original proposed financing trade, wherein the series of decomposed trades comprises a current trade that is netted and settled on the current day and a senes of forward trades that are netted and settled on future dates;
   storing the series of decomposed trades in a database; and
   transmitting, using an electronic connection, the series of decomposed trades to the counterparties for netting and settlement.

2. The method according to claim 1, wherein the counterparties are a first and a second party, the method further comprising:
   the first and second parties transmitting the series of decomposed trades to a netting and settlement party.

3. The method according to claim 1, wherein the counterparties are a first and a second party, the method further comprising:
   transmitting all of the series decomposed trades at once to the first and second parties.

4. The method according to claim 1, wherein the original proposed financing trade is between a first and a second party, the step of receiving further comprising:
   receiving a first proposed financing trade from the first party; and
   attempting to match the first proposed financing trade to another proposed financing trade.

5. The method according to claim 4, further comprising:
   receiving a second proposed financing trade from the second party; and
   matching the first proposed financing trade to the second proposed financing trade, wherein each of the first and second proposed financing trades reflect the terms and conditions of the original proposed financing trade.

6. The method according to claim 4, further comprising:
   repeating the step of attempting to match the first proposed financing trade until a cutoff time; and
   returning the first proposed financing trade to the first party if the cutoff time has been passed and the first proposed financing trade has not been matched.

7. The method according to claim 1, wherein the original proposed financing trade involved an Inter-Dealer-Broker (IDB), the step of receiving further comprising:
   receiving a first proposed financing trade from the first party;
   receiving a second proposed financing trade from the second party;
   receiving first and second IDB proposed financing trades from the IDB; and
   attempting to match the first proposed financing trade, the second proposed financing trade, the first IDB proposed financing trade and the second IDB proposed financing trade.

8. The method according to claim 1, wherein the decomposing step further comprises:
insuring that the series of decomposed trades are each on market and in accordance with market convention, wherein market convention requires the interest from the decomposed trades to be cleaned after completion of the trade.

9. The method according to claim 8, wherein the insuring step further comprises:
generating a forward yield curve, the forward yield curve containing daily on market rates for each day on which there is a decomposed trade.

10. The method according to claim 9, further comprising:
applying a respective on market rate from the forward yield curve to each of the decomposed trades.

11. The method according to claim 1, wherein each of the decomposed trades provides interest, the method further comprising:
calculating the compounding effect of the interest from the series of decomposed trades.

12. A computer-implemented method of managing financing trades, the method comprising:
receiving, using at least one interface device, an original financing trade, the original financing trade comprising a proposed repo trade having a term of a recited number of days starting with a current day;
decomposing, using at least one computer processor, the original financing trade into a series of decomposed trades with a final maturity of a final trade equal to the term of the original proposed financing trade, wherein the series of decomposed trades comprises a current trade that is netted and settled on the current day and a seris of forward trades that are netted and settled on future dates;
storing the series of decomposed trades in a database; and
transmitting, using an electronic connection, the series of decomposed trades to the counterparties for netting and settlement.

13. A computer-implemented method of managing financing trades, an original proposed financing trade being agreed to in principle by a first party and a second party, the original proposed financing trade comprising a proposed repo trade having a start date, an end date and an interest rate associated therewith, the method comprising:
receiving, using at least one user interface device, a first proposed financing trade from the first party, the first proposed financing trade reflecting the first party's understanding of the original proposed financing trade;
receiving, using the at least one user interface device, a second proposed financing trade from the second party, the second proposed financing trade reflecting the second party's understanding of the original proposed financing trade;
matching, using at least one computer processor, the first proposed financing trade with the second proposed financing trade, thereby generating a matched trade;
decomposing, using the at least one computer processor, the matched trade into a series of trades in response to the matched trade, the series of trades including a first trade starting on the start date, a last trade ending on the end date, and intervening overnight trades for the dates between the start and end dates, wherein the first trade being netted and settled on the start date and the intervening overnight trades and the last trade being netted and settled on future dates;
storing the series of overnight trades in a database; and
transmitting, using an electronic connection, the series of decomposed trades to the counterparties to the original proposed financing trade.

14. The method according to claim 13, wherein the generating step further comprises:
determining a forward yield curve for at least a period from the start date to the end date, the forward yield curve defining an on market interest rate for each day from the start date to the end date.

15. The method according to claim 14, wherein the forward yield curve is determined by interpolation.

16. The method according to claim 14, further comprising:
applying the on market interest rate to respective ones of the series of overnight trades.

17. The method according to claim 14, further comprising:
returning the first proposed financing trade to the first party and the second proposed financing trade to the second party if the first and second proposed financing trades do not match.

18. The method according to claim 13, further comprising:
cleaning up the interest on the particular decomposed trade after netting and settlement.

19. The method according to claim 13, wherein the original proposed financing trade is a proposed repo trade.

20. A system for managing financing trades, the system comprising:
at least one user interface device, the at least one user interface device receiving an original proposed financing trade, the original proposed financing trade comprising a proposed repo trade having a term of a recited number of days starting with a current date;
at least one computer processor including a decomposer coupled to the user interface device, the decomposer receiving the original proposed financing trade from the at least one user interface device and decomposing the original proposed financing trade into a series of decomposed trades, wherein the series of decomposed trade comprises a current trade that is netted and settled on the current day and a series of forward trades that are netted and settled on future dates;
a memory; and
a distributor coupled to the decomposer and coupled to the memory, the distributor receiving the series of decomposed trades from the decomposer and storing the series of decomposed trades in the memory, the distributor further transmitting the decomposed trades to counterparties of the original proposed financing trade.

21. The system according to claim 20, wherein the counterparties are a first and a second party, and wherein the distributor transmits the series of decomposed trades to the first and second parties which in turn transmit the series of decomposed trades to a netting and settlement party.

22. The system according to claim 20, wherein the counterparties are a first and a second party, and wherein the distributor transmits all of the series of decomposed trades at once to the first and second parties.

23. The system according to claim 20, wherein the counterparties are a first and a second party, and wherein the at least one user interface device receives a first proposed financing trade from the first party, the system further comprising:
a trade matcher coupled to the at least one user interface device, the trade matcher receiving the first proposed financing trade from the at least one user interface device and attempts to match the first proposed financing trade to another proposed financing trade.

24. The system according to claim 23, wherein the trade matcher receives a second proposed financing trade from the second party though the at least one user interface device, and wherein the trade matcher matches the first proposed financing trade to the second proposed financing trade if the first and second proposed financing trades have comparable terms and conditions.

25. The system according to claim 23, wherein the trade matcher repeatedly attempts to match the first proposed financing trade until a cutoff time, and wherein the trade matcher returns the first proposed financing trade to the first party if the cutoff time has been passed and the first proposed financing trade has not been matched.

26. The system according to claim 20, wherein the original proposed financing trade involved an Inter-Dealer-Broker (IDB), the system further comprising:
   a trade matcher coupled to the user interface, the trade matcher being operable to:
      receive a first proposed financing trade from the first party though the user interface,
      receive a second proposed financing trade from the second party though the user interface,
      receive first and second IDB proposed financing trades from the IDB though the at least one user interface device; and
      attempt to match the first proposed financing trade, the second proposed financing trade, the first IDB proposed financing trade and the second IDB proposed financing trade.

27. The system according to claim 20, wherein the series of decomposed trades generated by the decomposer are each on market and in accordance with market convention, wherein market convention requires the interest from the decomposed trades to be cleaned after completion of the trade.

28. The system according to claim 27, further comprising:
   a forward yield curve generator coupled to the decomposer, the forward yield curve generator generating a forward yield curve containing daily on market rates for each day on which there is a decomposed trade and transmitting the forward yield curve to the decomposer.

29. The system according to claim 28, wherein the decomposer applies a respective on market rate from the forward yield curve to each of the decomposed trades.

30. The system according to claim 20, wherein each of the decomposed trades provides interest, the system further comprising:
   an interest compound calculator coupled to the at least one user interface device, the interest compound calculator receiving data from a user and calculating the compounding effect of the interest from the series of decomposed trades.

31. A system for managing financing trades, the system comprising:
   at least one user interface device, the at least one user interface device receiving an original financing trade, the original financing trade comprising a proposed repo trade having a term of a recited number of days starting with a current date;
   at least one computer processor including a decomposer coupled to the at least one user interface device, the decomposer receiving the original financing trade from the at least one user interface device and decomposing the original financing trade into a series of decomposed trades, wherein the series of decomposed trade comprises a current trade that is netted and settled on the current day and a series of forward trades that are netted and settled on future dates;
   a memory; and
   a distributor coupled to the decomposer and coupled to the memory, the distributor receiving the series of decomposed trades from the decomposer and storing the series of decomposed trades in the memory, the distributor further transmitting the decomposed trades to counterparties of the original proposed financing trade.

* * * * *

UNITED STATES PATENT AND TRADEMARK OFFICE
CERTIFICATE OF CORRECTION

PATENT NO.      : 7,596,526 B2                                                    Page 1 of 1
APPLICATION NO. : 10/123946
DATED           : September 29, 2009
INVENTOR(S)     : Blauvelt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this

Fourteenth Day of December, 2010

David J. Kappos
*Director of the United States Patent and Trademark Office*